US012110167B2

(12) United States Patent
Michel et al.

(10) Patent No.: US 12,110,167 B2
(45) Date of Patent: Oct. 8, 2024

(54) INSULATION CONTAINER FOR TEMPERATURE-CONTROLLED TRANSPORT OF PHARMACEUTICAL PRODUCTS

(71) Applicant: va-Q-tec AG, Würzburg (DE)

(72) Inventors: Jonas Michel, Bamberg (DE); Lukas Endres, Würzburg (DE); Adrian Lesch, Großrinderfeld (DE); Thomas Taraschewski, Würzburg (DE); Markus Gorran, Würzburg (DE)

(73) Assignee: va-Q-tec AG, Würzburg (DE)

( * ) Notice: Subject to any disclaimer, the term of this patent is extended or adjusted under 35 U.S.C. 154(b) by 0 days.

(21) Appl. No.: 17/554,162

(22) Filed: Dec. 17, 2021

(65) Prior Publication Data

US 2022/0194683 A1 Jun. 23, 2022

(51) Int. Cl.

| | |
|---|---|
| ***B65D 81/38*** | (2006.01) |
| ***A61J 1/16*** | (2023.01) |
| ***B65D 25/04*** | (2006.01) |
| ***B65D 43/16*** | (2006.01) |
| ***B65D 81/18*** | (2006.01) |

(52) U.S. Cl.
CPC .......... *B65D 81/3823* (2013.01); *A61J 1/165* (2013.01); *B65D 25/04* (2013.01); *B65D 43/162* (2013.01); *B65D 81/18* (2013.01)

(58) Field of Classification Search
CPC .................................................. B65D 5/48038
See application file for complete search history.

(56) References Cited

U.S. PATENT DOCUMENTS

| | | | | |
|---|---|---|---|---|
| 1,986,263 | A * | 1/1935 | Hatch | B65D 85/78 62/371 |
| 6,910,582 | B2 * | 6/2005 | Lantz | B65D 81/3862 206/593 |
| 8,938,986 | B2 * | 1/2015 | Matta | F25D 3/06 62/530 |
| 10,843,840 | B2 * | 11/2020 | Sollie | B65D 25/02 |
| 2003/0213834 | A1 * | 11/2003 | Johnson | B65D 81/386 229/172 |
| 2017/0066582 | A1 * | 3/2017 | Vogel | F25D 3/06 |
| 2019/0177071 | A1 * | 6/2019 | Coulombe | B65D 5/48038 |

FOREIGN PATENT DOCUMENTS

| | | |
|---|---|---|
| CN | 106945905 A | 7/2017 |
| CN | 208731523 U | 4/2019 |
| JP | 2010006403 A | 1/2010 |
| JP | 2014000993 A | 1/2014 |

* cited by examiner

*Primary Examiner* — Mollie Impink
(74) *Attorney, Agent, or Firm* — Mark Terry

(57) ABSTRACT

Insulation container for the temperature-controlled transport of pharmaceutical products, comprising an outer container with an outer container base and an outer container wall, which are connected to one another in such a way as to form a receiving space open on one side, and wherein the insulation container comprises a lid which is designed to completely cover the receiving space by placing the lid on the outer container, and wherein the insulation container furthermore has a receiving space comprises inserted compartment which separates the receiving space into separate compartments.

15 Claims, 4 Drawing Sheets

INSULATION CONTAINER FOR TEMPERATURE-CONTROLLED TRANSPORT OF PHARMACEUTICAL PRODUCTS

CROSS-REFERENCE TO RELATED APPLICATIONS

This patent application claims priority to German utility patent application number 20 2020 107 340.0 filed Dec. 17, 2020 and titled “insulation container for temperature-controlled transport of pharmaceutical products”. The subject matter of patent application number 20 2020 107 340.0 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention relates to an insulation container for temperature-controlled transport of pharmaceutical products according to the independent claim. The invention pertains to the technical field of thermal transport solutions for transport without temperature fluctuations, in particular transport in the clinical-pharmaceutical industry.

BACKGROUND

The spectrum of temperature-controlled transports includes, depending on the goods transported, arctic deep-freeze degrees as well as spring-like 18° C. Logistics services of this kind, which are carried out for instance for medication and cosmetics, paints and varnishes, confectionery, and foodstuffs of all kinds, are reliant on a professionally organized, continuous supply chain that is uniformly temperature-controlled to suit the product requirements. Implementing a new transport solution can be challenging and expensive if not put into practice effectively. Any inefficiency in product or service transport can result in serious loss of time and resources.

It is known from prior art to provide containers for temperature-controlled transport of pharmaceutical products. Such insulation containers are equipped with an outer container with a bottom and a wall to hold dry ice and the transport goods in the interior space formed therefrom. The interior space is closed with a lid which completely covers the interior space or the interior, respectively. Such containers can, for example, be of modular design and consist of a lightweight construction material equipped with a moisture- and temperature-resistant surface. The stored dry ice keeps the temperatures in the interior constant for several days, which is ideally suited for global shipping of sensitive medication. The outer container also includes an insulating material to keep the temperature in the interior space of the container at a stable level. Such containers provide excellent passive thermal single-way and multi-way shipping protection for valuable temperature-sensitive products, such as highly sensitive pharmaceutical products. This is particularly important because the standards for transporting vaccines, for example, are very high and must be demonstrably maintained throughout the entire transport chain.

Dry ice is solid carbon dioxide ($CO_2$) and does not melt at an atmospheric pressure of approx. 1013 mbar (1 atmosphere), but changes directly into gaseous carbon dioxide, it sublimates and becomes a gas directly, expanding to 760 times its original volume. Under normal pressure, dry ice cannot get warmer than −78.4 degrees Celsius. Direct contact of dry ice with unprotected skin will cause frostbites or cold burns.

The problem here is that by reacting with moisture from the ambient air, the dry ice will stick to the container walls or freeze to the products being transported. This results in the clinical-pharmaceutical transport goods, for example, no longer being usable or only being usable to a limited extent.

Furthermore, US 2019/0177071A1 and CN 2 08 731 523 U are known from prior art.

SUMMARY

The invention has the object of providing an insulation container which overcomes the disadvantages in prior art and enables the transport of pharmaceutical products without freezing and/or sticking of the dry ice.

The object is achieved by an insulation container for temperature-controlled transport of pharmaceutical products having the features of independent claim 1. Advantageous embodiments form the subject-matter of the associated subclaims.

The invention encompasses an insulation container for temperature-controlled transport of pharmaceutical products comprising a (vacuum-insulated) outer container with an outer container bottom and an outer container wall, which are connected to each another in such a way as to form a receiving space which is open on one side. The insulation container includes a lid (lid or door element) designed so as to completely cover the receiving space by placing the lid onto the outer container. The insulation container further comprises a compartment structure which is inserted into the receiving space, and which separates the receiving space into separate compartments. The provision of a compartment structure allows for separate storage of dry ice and the product to be transported. This enables transport without causing the dry ice to freeze or stick to the product.

Preferably, the compartment structure comprises at least three (advantageously four) planar frame elements.

BRIEF DESCRIPTION OF THE DRAWINGS

The invention will be explained in greater detail below with reference to drawings, wherein.

DETAILED DESCRIPTION

Figure 1:
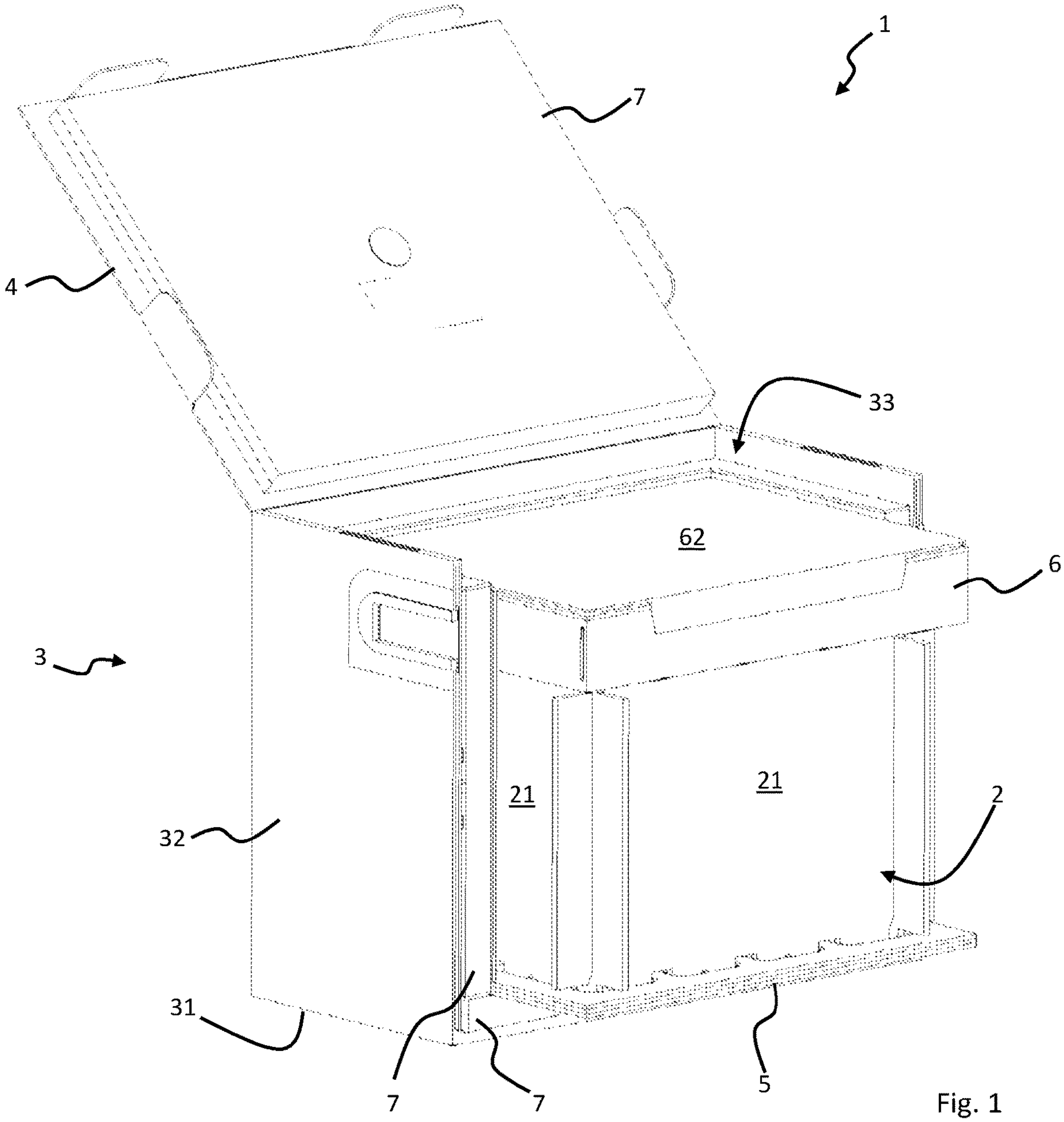
FIG. 1 shows a partial sectional view through an insulation container according to the invention with inserted compartment structure.

According to an advantageous aspect, the insulation container further comprises an outer shell disposed within the receiving space and surrounding the compartment structure in such a way as to separate the compartments formed by the compartment structure from the outer container wall. This ensures that the vacuum insulation panels of the outer container wall are protected against harmful exposure to the dry ice.

It is particularly advantageous if the frame elements each have a ridge portion which is formed in such a way as to connect two frame elements to each other in each case by engagement of the ridge portions. The ridge portion at the upper rim of a frame element is characterized in each case by elevations and indentations.

According to a preferred aspect, the ridge portion of at least one frame element comprises a plurality of recesses which are open on one side for receiving a further frame element in a plurality of positions. In this way, compartments of different sizes can be formed According to an advantageous aspect, the frame elements of the compartment structure are disposed so as to form a rectangular grid. Due to the rectangular arrangement, a higher stability of the compartment structure is obtained.

It is particularly advantageous if the compartment structure is designed in such a way as to separate the receiving space into a central compartment and a plurality of peripheral compartments when inserted into the receiving space, wherein the peripheral compartments are disposed completely or partially surrounding the central compartment. This makes it possible to temperature-control the transport goods in the central compartment uniformly from all sides.

Advantageously, the peripheral compartments are connected to each other by means of a passageway. This allows media exchange between the peripheral compartments.

According to a preferred aspect, the peripheral compartments each have a rectangular opening cross-section of width B and length L, where B≤L and 1 cm≤B≤10 cm, in particular 2 cm≤B≤6 cm. This allows a safe introduction of the transport goods and dry ice in sufficient quantity.

It has been proven advantageous if $CO_2$ in a solid aggregate state (dry ice) and/or cold accumulator elements are disposed in the peripheral compartments. Cold accumulator elements can be, for example, latent heat accumulators (also known as phase change or phase change material (PCM) accumulators), which is a special type of heat accumulator which stores a large part of the thermal energy supplied thereto in the form of latent heat (e.g., for a phase change from solid to liquid state). Phase change materials absorb heat during melting and release it again during crystallization/freezing. This allows the required storage temperature to be maintained for the duration of the transport. This gives the advantage that PCM and dry ice can be combined with each other.

It is particularly advantageous if the compartment structure is formed of cold accumulator elements. This allows the frame elements to be omitted and the peripheral compartments for the dry ice to be formed of specially designed accumulator shells.

Advantageously, the insulation container comprises a bottom insert, which is disposed between the outer container bottom and the compartment structure, and which has bottom insert depressions. This ensures a homogeneous temperature distribution in the interior space of the insulation container.

According to a preferred aspect, the bottom insert includes a first layer with a closed surface, a second layer with transversely directed recesses arranged on the first layer, and a third layer with longitudinally directed recesses arranged on the second layer. As a result, the bottom insert is easy to manufacture, and the product is well ventilated.

According to an advantageous aspect, the insulation container comprises a lid insert comprising at least one lid compartment for receiving $CO_2$ in solid aggregate state (dry ice) and/or cold accumulator elements, and which lid insert is designed so as to completely cover the receiving space. This allows the dry ice to also be provided from above.

The volume of the peripheral compartments has a volume ratio relative to the volume of the lid compartment (61) in the range of 80/20 to 50/50.

Preferably, the bottom insert comprises a volume that is smaller than or equal to the volume of the lid compartment.

Advantageously, handles are arranged on the lid compartment. This enables convenient and safe removal of the products.

It is particularly advantageous if the lid compartment is covered with a cover element. This prevents direct contact between the dry ice and the vacuum insulation panel of the outer container wall.

It has proven advantageous if the frame elements and the lid compartment comprise openings which are designed in such a way that the compartments are connected to each other in an air-permeable manner. This ensures homogeneous temperature distribution in the interior space of the insulation container.

According to a preferred aspect, the frame elements comprise cardboard or plastic, in particular kraft liner or twin-wall sheets. This makes the compartments moisture-resistant, easy to handle, inexpensive to manufacture and easy to recycle.

Advantageously, the insulation container comprises at least one vacuum insulation element which is disposed in the insulation container in such a way as to at least partially enclose the receiving space. The vacuum insulation element comprises, for example, a silica sheet or silica powder or a glass fiber sheet or a polyurethane sheet.

It is particularly advantageous if a thermal insulation material is disposed between the vacuum insulation elements. This ensures that the temperature in the interior space can be kept constant over the entire transport time.

FIG. 1 shows an insulation container 1 according to the invention for temperature-controlled transport of pharmaceutical products. The insulation container 1 comprises an outer container 3 with an outer container bottom 31 and an outer container wall 32. In the exemplary embodiment, the outer container wall 32 consists of four parts which are set up vertically on the outer container wall 32 and are connected to each other in such a way that a square receiving space 33 which is open on one side is formed. Furthermore, FIG. 1 shows a lid 4 for placement onto the insulation container 1, which completely covers the outer container 3 and the receiving space 33. A compartment structure 2 is inserted into the receiving space 33 of the insulation container 1 and consists of at least three planar frame elements 21. The frame elements 21 are connected to each other in such a way that the compartment structure 2 is self-standing and separates the receiving space 33 into separate compartments. The frame elements 21 of the insulation container 1 may be made of cardboard or plastic, for example.

FIG. 1 further shows a bottom insert 5 of the insulation container 1 with depressions, which is disposed between an outer container bottom 31 and the compartment structure 2.

It can be seen from FIG. 1 that vacuum insulation elements 7 are inserted around the receiving space 33 of the insulation container 1, which at least partially enclose the receiving space 33. A thermal insulation material can be inserted between the vacuum insulation elements 7, for example.

Figure 2:
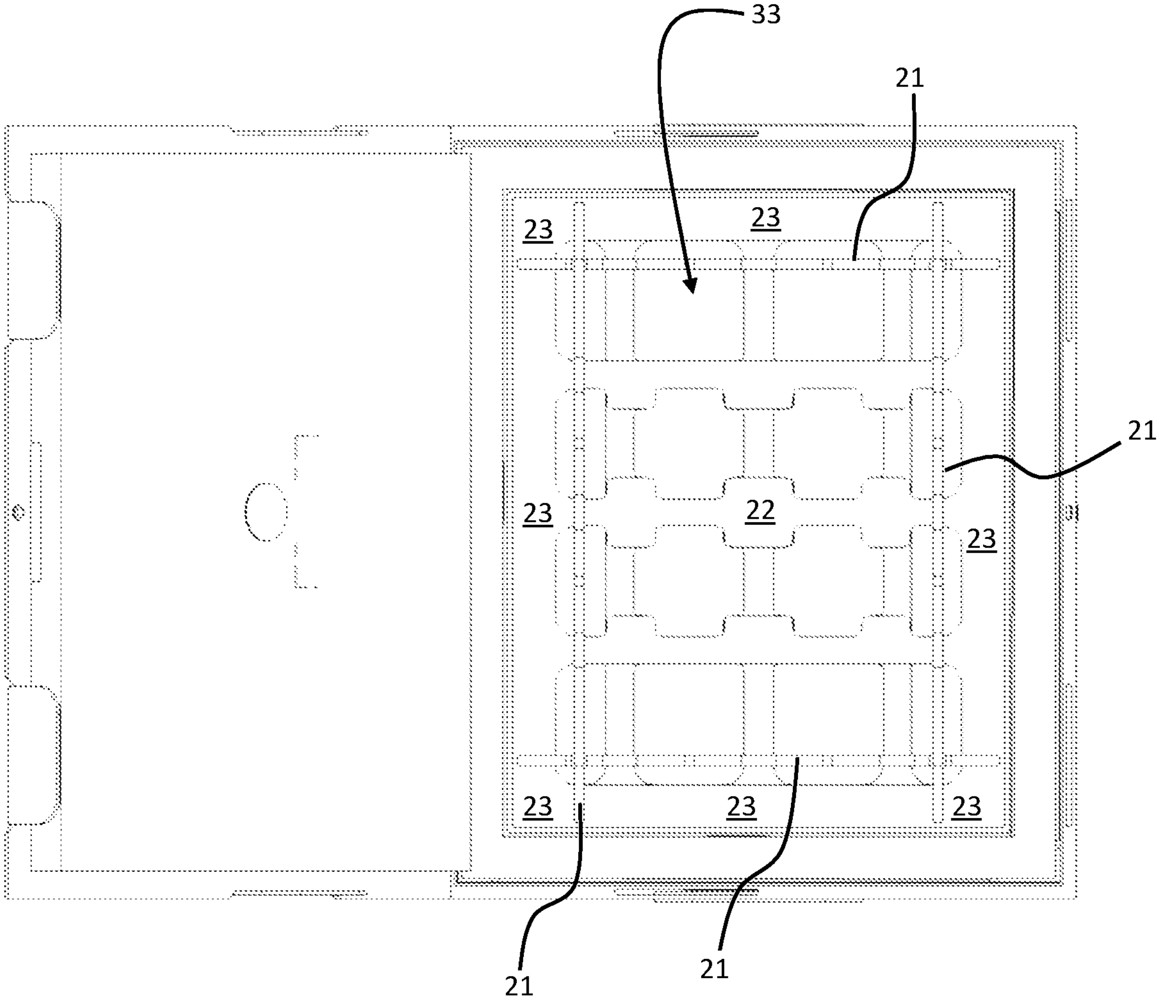
FIG. 2 shows a top view of an insulation container according to the invention (from above) with inserted compartment structure.

FIG. 2 shows a top view of an insulation container 1 according to the invention (from above) with inserted compartment structure 2. It can be seen from this figure that the frame elements 21 of the compartment structure 2 are disposed in such a way that a rectangular grid is formed. By inserting the compartment structure 2 into the receiving space 33, the latter is separated into a central compartment 22 and a plurality of peripheral compartments 23. The central compartment 22 is thereby completely surrounded by the peripheral compartments 23. The peripheral compartments 23 each have a rectangular opening cross-section A, a width B and length L. For example, B≤L and B≤L and 1 cm≤B≤10 cm, in particular 2 cm≤B≤6 cm. Dry ice ($CO_2$ in a solid aggregate state) and/or cold accumulator elements can be introduced into the peripheral compartments 23 to temperature-control the transport goods.

Figure 3:
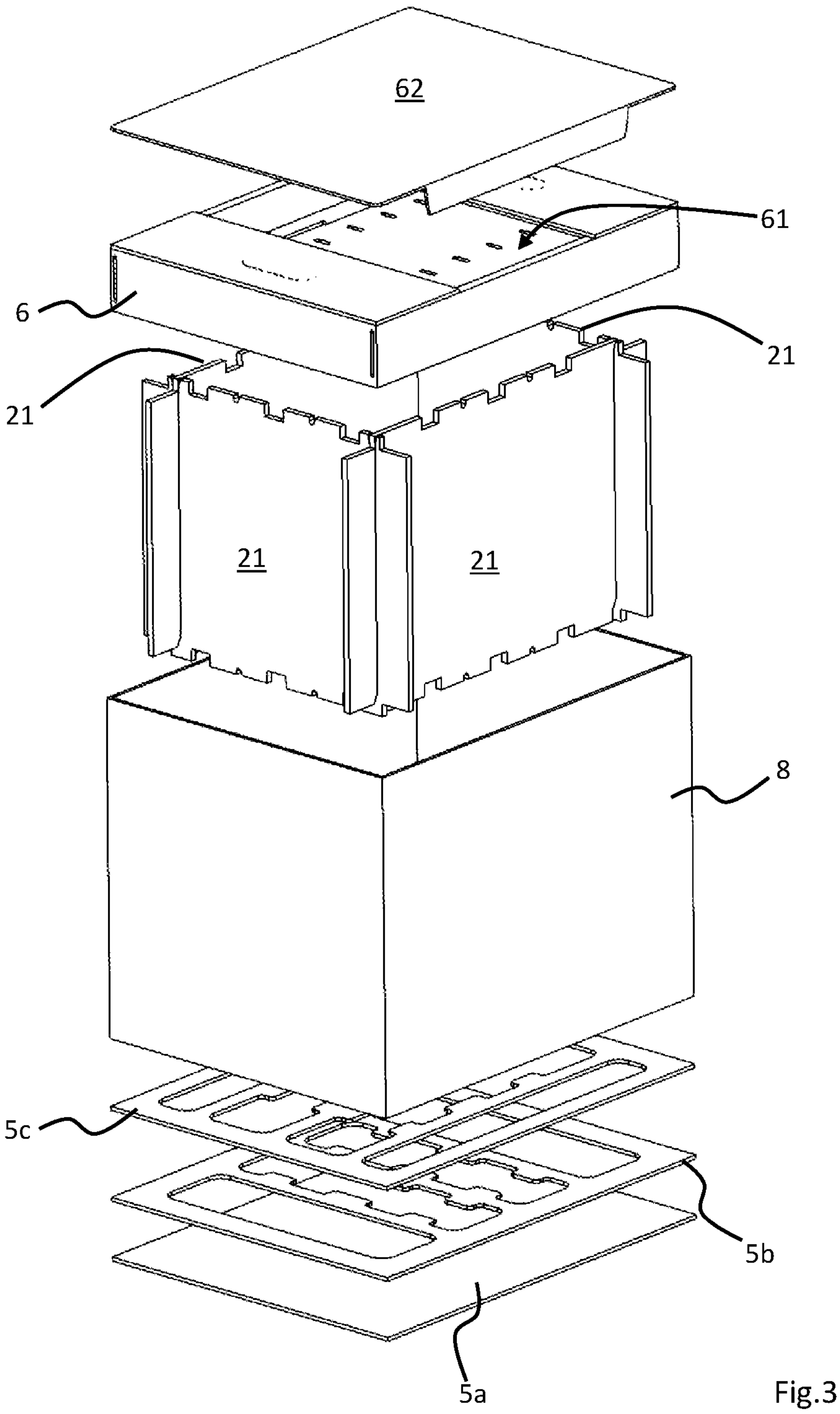
FIG. 3 shows an exploded view of an insulation container according to the invention.

FIG. 3 shows an exploded view of an insulation container 1 according to the invention with an outer shell 8. The outer shell 8 is disposed around the receiving space 33 and the compartment structure 2 located therein in such a way that the compartments formed by the compartment structure 2 are separated from the outer container wall 32.

As shown in FIG. 3, the bottom insert 5 includes a first layer 5*a* having a closed surface and an overlying second layer 5*b*. A third layer 5*c* is disposed above the second layer 5*b*. The recesses of the two layers 5*b*, 5*c* are directed transversely to each other.

In addition, FIG. 3 shows a lid insert 6 for the insulation container 1, with a lid compartment 61. Dry ice ($CO_2$ in a solid aggregate state) or cold accumulator elements, for example, can be introduced into this lid compartment 61 in order to temperature-control the transport goods. The lid compartment 61 is covered by a cover element 62. The lid insert 6 serves the purpose of completely covering the receiving space 33.

Figure 4:
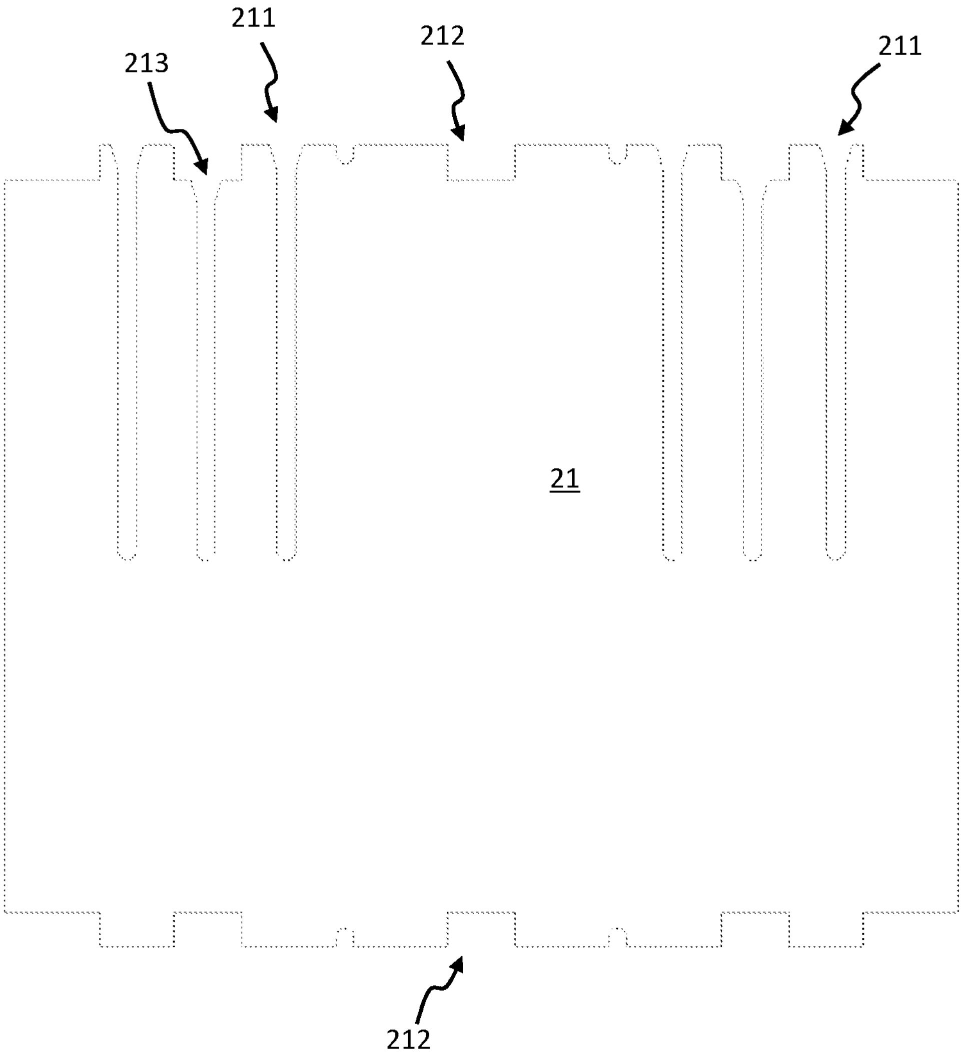
FIG. 4 shows a side wall of an insulation container according to the invention.

FIG. 4 shows a side wall of an insulation container according to the invention. The frame elements 21 of the insulation container 1 each have a ridge portion 211, which is designed in such a way that two frame elements 21 can be connected to each another by engagement of the ridge portions 211. For this purpose, the ridge portion 211 has a plurality of recesses 213 which are open on one side and a further frame element 21 can be provided thereon in each case in a plurality of positions. Openings 212 are provided on the frame elements 21 to ensure that the compartments are connected to each other in an air-permeable manner.

What is claimed is:

1. Insulation container for temperature-controlled transport of pharmaceutical products, comprising an outer container with an outer container bottom and an outer container wall which are connected to each other in such a way as to form a receiving space which is open on one side, and wherein the insulation container comprises a lid which is designed in such a way as to completely cover the receiving space by placement of the lid onto the outer container, and wherein the insulation container further comprises a compartment structure which is inserted into the receiving space and which separates the receiving space into separate compartments, wherein the compartment structure comprises multiple planar frame elements, wherein the frame elements each have a ridge portion configured to connect two frame elements in each case by engagement of the ridge portions and wherein the ridge portion of at least one frame element has a plurality of recesses which are open on one side for receiving another frame element in a plurality of positions, wherein the insulation container comprises a bottom insert which is disposed between outer container bottom and the compartment structure, wherein the bottom insert comprises a first layer with a closed surface, a second layer with transversely directed recesses, the second layer arranged on the first layer, and a third layer with longitudinally directed recesses, the third layer arranged on the second layer and wherein the planar frame elements comprise openings which are designed in such a manner that portions of the planar frame elements between the openings fit into the recesses of the second layer and the third layer.

2. Insulation container according to claim 1, wherein the compartment structure comprises at least three planar frame elements.

3. Insulation container according to claim 1, further comprising an outer shell disposed within the receiving space and surrounding the compartment structure in such a way as to separate the compartments formed by the compartment structure from the outer container wall.

4. Insulation container according to claim 1, wherein the frame elements of the compartment structure are disposed so as to form a rectangular grid.

5. Insulation container according to claim 1, wherein the compartment structure is designed in such a way as to separate the receiving space into a central compartment and a plurality of peripheral compartments when inserted into the receiving space, wherein the peripheral compartments are disposed completely or partially surrounding the central compartment.

6. Insulation container according to claim 5, wherein the peripheral compartments are connected to each other by means of a passageway.

7. Insulation container according to claim 5, wherein the peripheral compartments each have a rectangular opening cross-section (A) of width B and length L, where B≤L and 1 cm≤B≤10 cm.

8. Insulation container according to claim 5, wherein $CO_2$ in solid aggregate state (dry ice) and/or cold accumulator elements are disposed in the peripheral compartments.

9. Insulation container according to claim 1, comprising a lid insert which comprises at least one lid compartment for receiving $CO_2$ in a solid aggregate state (dry ice) and/or cold accumulator elements, and which lid insert is designed in such a way as to cover the receiving space.

10. Insulation container according to claim 9, wherein the volume of the peripheral compartments relative to the volume of at least one of the lid compartments has a volume ratio in the range of 80/20 to 50/50.

11. Insulation container according to claim 9, wherein the bottom insert comprises a volume that is smaller than or equal to the volume one of the lid compartment.

12. Insulation container according to claim 9, wherein at least one of the lid compartments is covered with a cover element.

13. Insulation container according to claim 9, wherein at least one of the lid compartments comprise openings which are designed in such a way that the compartments are connected to each other in an air-permeable manner.

14. Insulation container according to claim 13, wherein the frame elements, the outer shell, the compartment structure, the bottom insert, the lid insert, the lid compartments and the cover element comprise cardboard or plastic.

15. Insulation container according to claim 1, comprising at least one vacuum insulation element which is disposed in the insulation container in such a way as to at least partially enclose the receiving space.

* * * * *